United States Patent
Chu et al.

(10) Patent No.: US 11,663,468 B2
(45) Date of Patent: May 30, 2023

(54) METHOD AND APPARATUS FOR TRAINING NEURAL NETWORK, AND STORAGE MEDIUM

(71) Applicant: Beijing Xiaomi Intelligent Technology Co., Ltd., Beijing (CN)

(72) Inventors: Xiangxiang Chu, Beijing (CN); Ruijun Xu, Beijing (CN); Bo Zhang, Beijing (CN); Jixiang Li, Beijing (CN); Qingyuan Li, Beijing (CN); Bin Wang, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 493 days.

(21) Appl. No.: 16/744,674

(22) Filed: Jan. 16, 2020

(65) Prior Publication Data

US 2021/0133563 A1 May 6, 2021

(30) Foreign Application Priority Data

Oct. 31, 2019 (CN) .......................... 201911053898.8

(51) Int. Cl.
*G10L 25/30* (2013.01)
*G06N 3/08* (2023.01)
*G06N 3/04* (2023.01)

(52) U.S. Cl.
CPC ............. *G06N 3/08* (2013.01); *G06N 3/04* (2013.01); *G10L 25/30* (2013.01)

(58) Field of Classification Search
None
See application file for complete search history.

(56) References Cited

U.S. PATENT DOCUMENTS

| 5,255,347 A * | 10/1993 | Matsuba ............. G06N 3/0454 706/31 |
| 2015/0006444 A1 * | 1/2015 | Tamatsu ................. G06N 3/082 706/12 |

(Continued)

FOREIGN PATENT DOCUMENTS

WO    WO 2019/152929 A1    8/2019

OTHER PUBLICATIONS

Zichao Guo et al., "Single Path One-Shot Neural Architecture Search with Uniform Sampling", arxiv.org, Cornell University Library, 201 Olin Library Cornell University Ithaca, NY14853, Mar. 31, 2019, 14 pages.

(Continued)

*Primary Examiner* — Jesse S Pullias
(74) *Attorney, Agent, or Firm* — Finnegan, Henderson, Farabow, Garrett & Dunner, L.L.P.

(57) ABSTRACT

A method for training a neural network, includes: training a super network to obtain a network parameter of the super network, wherein each network layer of the super network includes multiple candidate network sub-structures in parallel; for each network layer of the super network, selecting, from the multiple candidate network sub-structures, a candidate network sub-structure to be a target network sub-structure; constructing a sub-network based on target network sub-structures each selected in a respective network layer of the super network; and training the sub-network, by taking the network parameter inherited from the super network as an initial parameter of the sub-network, to obtain a network parameter of the sub-network.

14 Claims, 12 Drawing Sheets

(56) References Cited

U.S. PATENT DOCUMENTS

| | | | |
|---|---|---|---|
| 2019/0228310 A1* | 7/2019 | Inagaki | G06N 3/0445 |
| 2020/0380372 A1* | 12/2020 | Wierstra | G06N 3/086 |
| 2020/0387795 A1* | 12/2020 | Chu | G06N 3/082 |
| 2021/0004676 A1* | 1/2021 | Jaderberg | G06N 3/0481 |

OTHER PUBLICATIONS

Yizhou Zhou et al., "One-Shot Neural Architecture Search Through A Posteriori Distribution Guided Sampling", arxiv.org, Cornell University Library, 201 Olin Library Cornell University Ithaca, NY14853, Jun. 23, 2019, 10 pages.

Albert Shaw et al., "SqueezeNAS: Fast Neural Architecture Search for Faster Semantic Segmentation", 2019 IEEE/CVF International Conference on Computer Vision Workshop (ICCVW), IEEE, Oct. 27, 2019, 12 pages.

Xiangxiang Chu et al., "FairNAS: Rethinking Evaluation Fairness of Weight Sharing Neural Architecture Search", Aug. 14, 2019, XP055697835, Retrieved from the Internet: URL: https://arxiv.org/pdf/1907.01845v2. pdf [retrieved on May 25, 2020], 12 pages.

Jathushan Rajasegaran et al., "Random Path Selection for Incremental Learning", arxiv.org, Cornell University Library, 201 Olin Library Cornell University Ithaca, NY14853, Jun. 4, 2019, 10 pages.

European Search Report in European Application No. 20152649.8, dated Jul. 21, 2020.

Anonymous authors, Fast Neural Network Adaptation via Parameters Remapping, OpenReview, Sep. 26, 2019, 13 pages.

Chen, Y., et al., DetNAS: Neural Architecture Search on Object Detection, arXiv:1903.10979v1, Mar. 26, 2019, 9 pages.

* cited by examiner

METHOD AND APPARATUS FOR TRAINING NEURAL NETWORK, AND STORAGE MEDIUM

CROSS-REFERENCE TO RELATED APPLICATIONS

The present application is based on and claims priority to Chinese Patent Application No. 201911053898.8 filed on Oct. 31, 2019, the entire content of which is incorporated herein for reference.

TECHNICAL FIELD

The disclosure relates to the technical field of neural networks, and particularly to a method and apparatus for training a neural network, and a storage medium.

BACKGROUND

A neural network is a mathematical algorithm model conducting distributed parallel information processing by simulating behavior characteristics of an animal neural network. The neural network implements the purpose of information processing by mainly relying on the complexity of a system and adjusting mutual connection relations between a large number of nodes within the system. Neural networks are widely applied in the field of data processing, for example, data classification, voice analysis and image recognition. A neural network has to be trained before being used. However, existing methods for training a neural network may cause large computation burdens and have low efficiency.

SUMMARY

A method and apparatus for training a neural network, and a storage medium are provided in the disclosure.

According to a first aspect of embodiments of the disclosure, a method for training a neural network includes: training a super network to obtain a network parameter of the super network, wherein each network layer of the super network includes multiple candidate network sub-structures in parallel; for each network layer of the super network, selecting, from the multiple candidate network sub-structures, a candidate network sub-structure to be a target network sub-structure; constructing a sub-network based on target network sub-structures each selected in a respective network layer of the super network; and training the sub-network, by taking the network parameter inherited from the super network as an initial parameter of the sub-network, to obtain a network parameter of the sub-network.

According to a second aspect of embodiments of the disclosure, an apparatus for training a neural network is provided, including: a processor; and a memory configured to store instructions executable by the processor, wherein the processor is configured to: train a super network to obtain a network parameter of the super network, wherein each network layer of the super network includes multiple candidate network sub-structures in parallel; for each network layer of the super network, select, from the multiple candidate network sub-structures, a candidate network sub-structure to be a target network sub-structure; construct a sub-network based on target network sub-structures each selected in a respective network layer of the super network; and train the sub-network, by taking the network parameter inherited from the super network as an initial parameter of the sub-network, to obtain a network parameter of the sub-network.

According to a third aspect of embodiments of the disclosure, a non-transitory computer-readable storage medium has stored therein instructions that, when executed by a processor of a device, cause the device to perform the above method for training the neural network.

It should be understood that the general description above and detailed description later are merely exemplary and explanatory, and do not restrict the disclosure.

BRIEF DESCRIPTION OF THE DRAWINGS

The accompanying drawings herein are incorporated into the specification and constitute part of the present specification, illustrate embodiments consistent with the disclosure, and explain the principles of the disclosure together with the specification.

DETAILED DESCRIPTION

Detailed description will be made here to exemplary embodiments, examples of which are illustrated in the accompanying drawings. When drawings are involved in the following description, identical numerals in different drawings refer to identical or similar elements, unless otherwise indicated. Implementations described in the following exemplary embodiments do not represent all the implementations consistent with the disclosure. On the contrary, they are merely examples of apparatuses and methods consistent with some aspects of the disclosure as recited in the appended claims.

Figure 1:
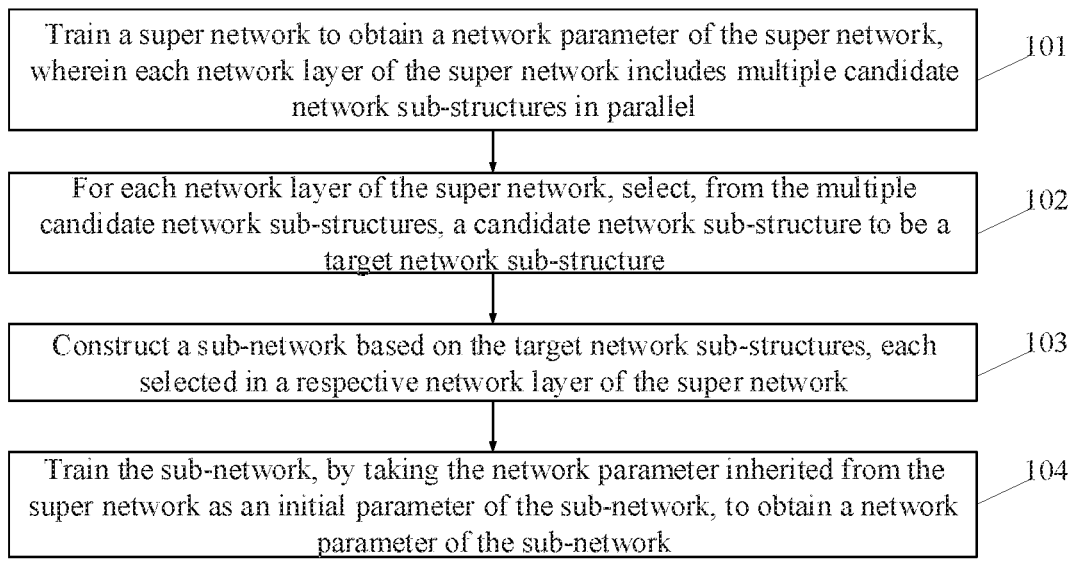
FIG. 1 illustrates a flowchart of a method for training a neural network according to some embodiments of the disclosure.

FIG. 1 illustrates a flowchart of a method for training a neural network according to some embodiments of the disclosure. As illustrated in FIG. 1, the method includes the following steps.

In step 101, a super network is trained to obtain a network parameter of the super network. Each network layer of the super network includes multiple candidate network sub-structures in parallel.

For example, the network parameter of the super network includes a weight parameter of the super network. In some embodiments, the network parameter further includes a threshold parameter of the super network.

In an embodiment, the super network may be trained based on collected sample data to obtain the weight parameter of the super network. A data type of the sample data may be an image data type, a text data type, or an audio data type.

In an embodiment, a sub-network obtained by training may be a neural network for realizing a pre-determined function, including but not limited to at least one of the following functions: target segmentation for segmenting a target apart from background in an input image; classification of a target in the input image; input image based target tracking; medical image based diagnosis assistance; input voice based voice recognition, voice correction, etc.

The above are merely examples of the pre-determined functions realized by the sub-network, and the particular implementation is not limited to the examples above.

In embodiments of the disclosure, the super network includes at least one network layer, and each of the network layer contains multiple candidate network sub-structures. The candidate network sub-structures construct part of the super network. For example, each candidate network sub-structure is distinguished according to a structure identifier of the candidate network sub-structure. The structure identifier may be a serial number or a name of the candidate network sub-structure. Different candidate network sub-structures may be composed by different network sub-models for realizing same or similar functions, or different candidate network sub-structures may be composed by different network sub-models for realizing different functions.

In step 102, for each network layer of the super network, a candidate network sub-structure is selected from the multiple candidate network sub-structures, to be a target network sub-structure.

In the embodiment, a candidate network sub-structure may be selected, from a respective network layer, to be a target network sub-structure for constructing the sub-network.

In step 103, a sub-network is constructed based on the target network sub-structures, each selected in a respective network layer of the super network.

In step 104, the sub-network is trained by taking the network parameter inherited from the super network as an initial parameter of the sub-network, to obtain a network parameter of the sub-network.

In the embodiment, after the sub-network is constructed, the network parameter in the super network may be assigned to the sub-network so that the sub-network inherits the network parameter from the super network; and the sub-network is trained on the basis that the sub-network has the network parameter, without the need of training the sub-network starting from nothing. As such, the network parameter of the obtained sub-network includes a final weight parameter obtained by training the sub-network.

In the embodiment, the network parameter inherited from the super network before training the sub-network corresponds to an initial parameter for training the sub-network alone.

In embodiments of the disclosure, a sub-network can inherit a network parameter from a super network; the network parameter is taken as an initial parameter of the sub-network, so as to train the sub-network to obtain a network parameter of the sub-network. There is no need of training the sub-network starting from nothing. The computation burden in the process of neural network training can be reduced, thus improving the efficiency of neural network training.

Figure 2:
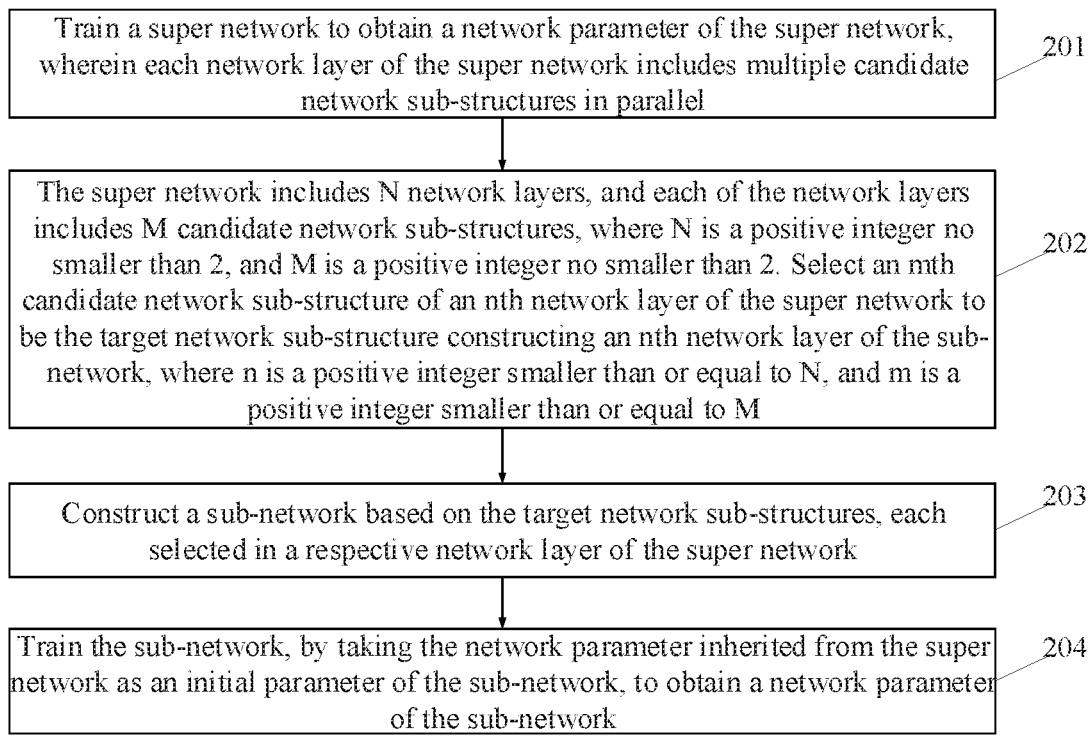
FIG. 2 illustrates a flowchart of a method for training a neural network according to some embodiments of the disclosure.

FIG. 2 illustrates a flowchart of a method for training a neural network according to some embodiments of the disclosure. As illustrated in FIG. 2, the method includes the following steps.

In step 201, a super network is trained to obtain a network parameter of the super network. Each network layer of the super network includes multiple candidate network sub-structures in parallel.

In step 202, the super network includes N network layers, and each of the network layers includes M candidate network sub-structures, where N is a positive integer no smaller than 2, and M is a positive integer no smaller than 2. An $m^{th}$ candidate network sub-structure of an $n^{th}$ network layer of the super network is selected to be the target network sub-structure constructing an $n^{th}$ network layer of the sub-network, where n is a positive integer smaller than or equal to N, and m is a positive integer smaller than or equal to M.

In the embodiment, a candidate network sub-structure may be selected from a respective network layer based on a single path activation algorithm, and the selected candidate network sub-structure is taken as a target network sub-structure for constructing the sub-network.

In step 203, a sub-network is constructed based on the target network sub-structures, each selected in a respective network layer of the super network.

In step 204, the sub-network is trained by taking the network parameter inherited from the super network as an initial parameter of the sub-network, to obtain a network parameter of the sub-network.

In embodiments of the disclosure, a candidate network sub-structure is selected from each network layer based on a single path activation algorithm, to be a target network sub-structure constructing the sub-network, which can simplify the complexity of neural network training, so as to improve the efficiency of neural network training.

Figure 3:
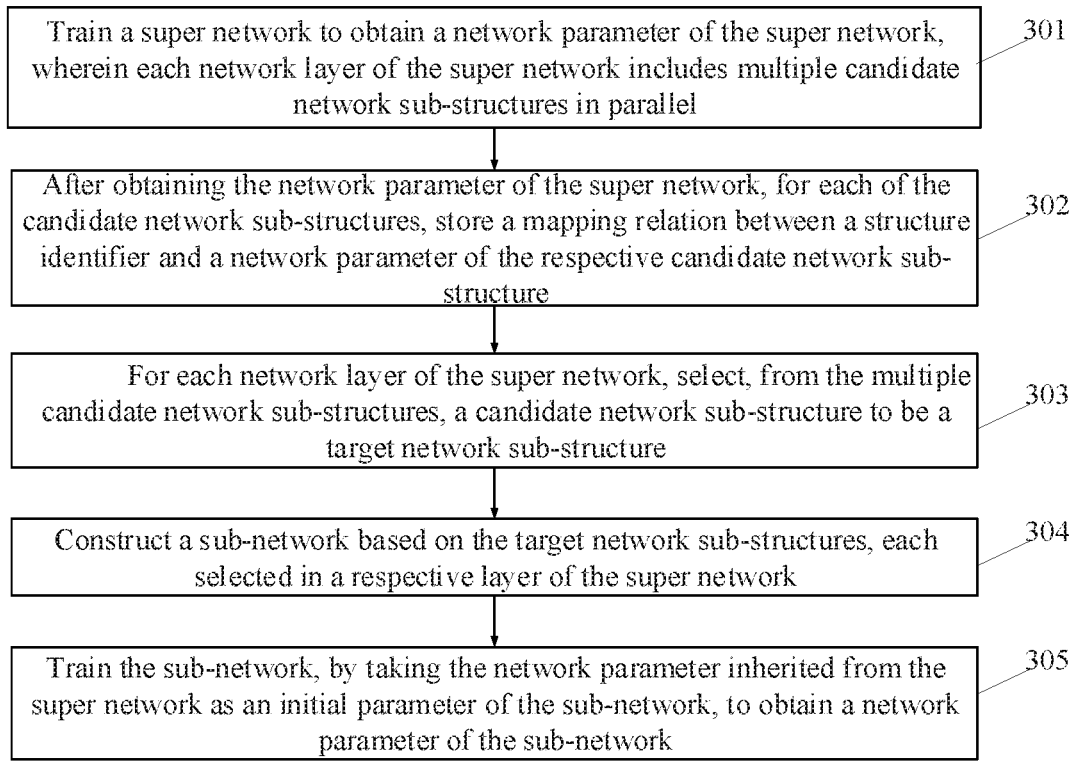
FIG. 3 illustrates a flowchart of a method for training a neural network according to some embodiments of the disclosure.

FIG. 3 illustrates a flowchart of a method for training a neural network according to some embodiments of the disclosure. As illustrated in FIG. 3, the method includes the following steps.

In step 301, a super network is trained to obtain a network parameter of the super network. Each network layer of the super network includes multiple candidate network sub-structures in parallel.

In step 302, after obtaining the network parameter of the super network, for each of the candidate network sub-structures, a mapping relation between a structure identifier and a network parameter of the respective candidate network sub-structure is stored.

The structure identifier may be a serial number or a name of the candidate network sub-structure. In an embodiment, after obtaining the network parameter, for each of the candidate network sub-structures, a mapping relation between a structure identifier and a network parameter of the respective candidate network sub-structure can be established, and stored in a set mapping table. When the network parameter corresponding to a candidate network sub-structure is to be acquired, the mapping relation between the structure identifier and the network parameter of the candidate network sub-structure can be queried directly according to the structure identifier of the candidate network sub-structure, so that the efficiency of neural network training can be improved.

In step 303, for each network layer of the super network, a candidate network sub-structure is selected to be a target network sub-structure, from the multiple candidate network sub-structures.

In step 304, a sub-network is constructed based on the target network sub-structures, each selected in a respective network layer of the super network.

In step 305, the sub-network is trained by taking the network parameter inherited from the super network as an initial parameter of the sub-network, to obtain a network parameter of the sub-network.

Figure 4:
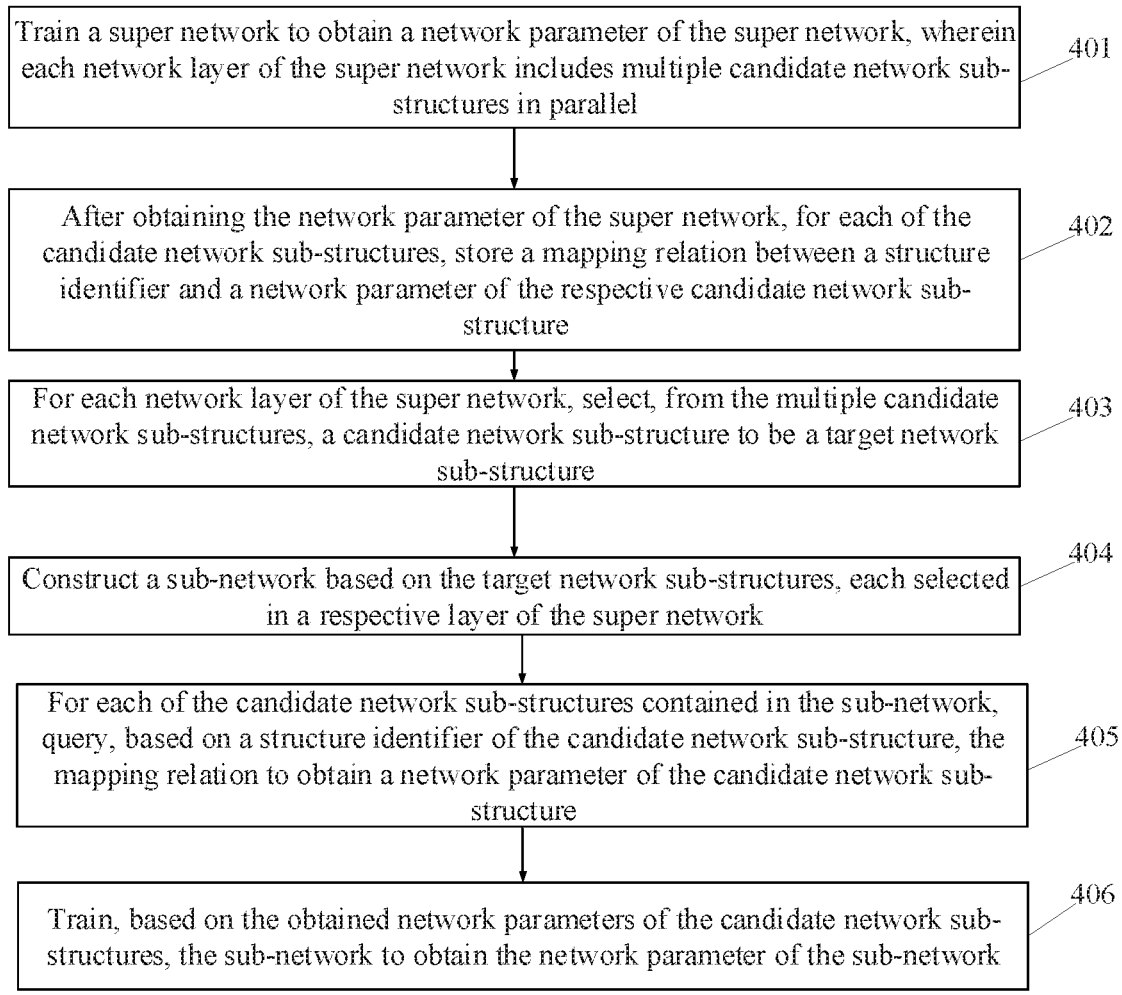
FIG. 4 illustrates a flowchart of a method for training a neural network according to some embodiments of the disclosure.

FIG. 4 illustrates a flowchart of a method for training a neural network according to some embodiments of the disclosure. As illustrated in FIG. 4, the method includes the following steps.

In step 401, a super network is trained to obtain a network parameter of the super network. Each network layer of the super network includes multiple candidate network sub-structures in parallel.

In step 402, after obtaining the network parameter of the super network, for each of the candidate network sub-structures, a mapping relation between a structure identifier and a network parameter of the respective candidate network sub-structure is stored.

In step 403, for each network layer of the super network, a candidate network sub-structure is selected to be a target network sub-structure, from the multiple candidate network sub-structures.

In step 404, a sub-network is constructed based on the target network sub-structures, each selected in a respective network layer of the super network.

In step 405, for each of the candidate network sub-structures contained in the sub-network, the mapping relation is queried, based on a structure identifier of the candidate network sub-structure, to obtain a network parameter of the candidate network sub-structure.

After the super network is trained, the network parameter corresponding to each candidate network sub-structure can be obtained, and the mapping relation between the structure identifier and the network parameter of the respective network sub-structure can be established. Here, the mapping relation can be stored in a mapping table. In embodiments of the disclosure, based on the structure identifier of the respective candidate network sub-structure contained in the sub-network, a corresponding network parameter can be acquired from the mapping table, and the network parameter is shared to the corresponding candidate network sub-structure in the sub-network.

In step 406, the sub-network is trained, based on the obtained network parameters of the candidate network sub-structures, to obtain the network parameter of the sub-network.

In embodiments of the disclosure, the mapping relation between a structure identifier and a network parameter of a candidate network sub-structure is queried directly according to the structure identifier of the candidate network sub-structure, and the sub-network is trained to obtain the network parameter of the sub-network. The computation burden in the process of neural network training can be reduced, thus improving the efficiency of neural network training.

Figure 5:
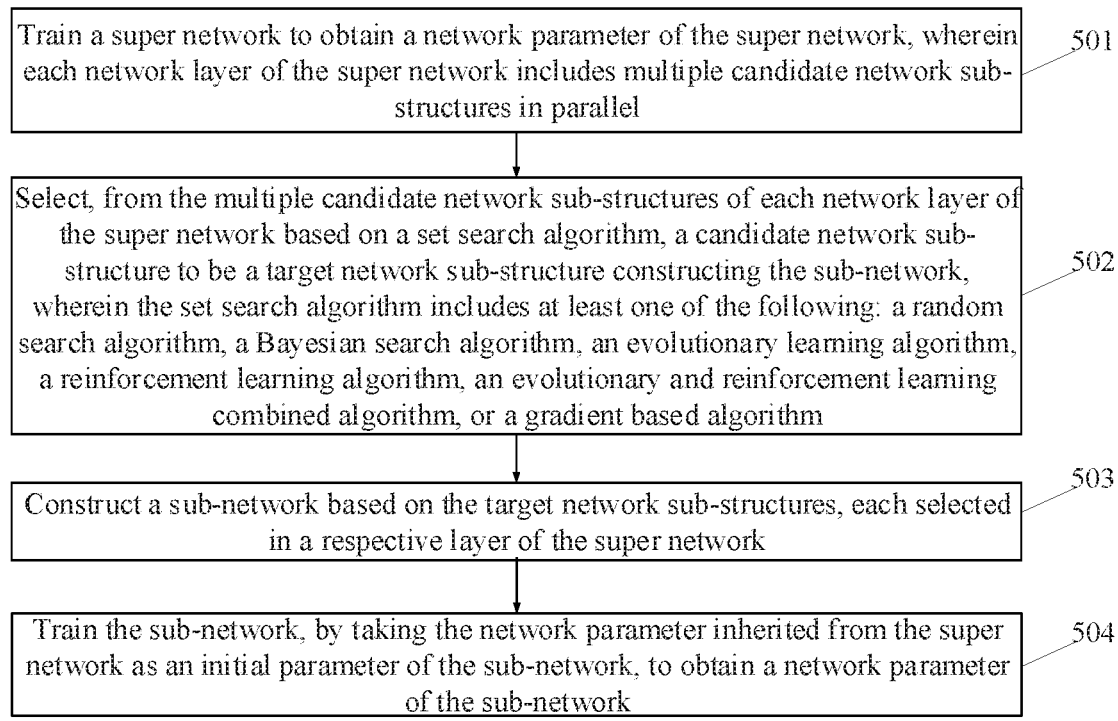
FIG. 5 illustrates a flowchart of a method for training a neural network according to some embodiments of the disclosure.

FIG. 5 illustrates a flowchart of a method for training a neural network according to some embodiments of the disclosure. As illustrated in FIG. 5, the method includes the following steps.

In step 501, a super network is trained to obtain a network parameter of the super network. Each network layer of the super network includes multiple candidate network sub-structures in parallel.

In step 502, a candidate network sub-structure is selected to be a target network sub-structure constructing the sub-network, based on a set search algorithm, from the multiple candidate network sub-structures of each network layer of the super network. The set search algorithm includes at least one of the following: a random search algorithm, a Bayesian search algorithm, an evolutionary learning algorithm, a reinforcement learning algorithm, an evolutionary and reinforcement learning combined algorithm, or a gradient based algorithm.

In step 503, a sub-network is constructed based on the target network sub-structures, each selected in a respective network layer of the super network.

In step 504, the sub-network is trained by taking the network parameter inherited from the super network as an initial parameter of the sub-network, to obtain a network parameter of the sub-network.

In an embodiment, the method further includes: processing input data based on the trained sub-network. A type of the input data includes at least one of the following: an image data type, a text data type, or an audio data type.

In an embodiment, the method further includes: conducting performance evaluation on the trained sub-network based on a test data set, to obtain an evaluation result. The type of test data in the test data set includes at least one of the following: an image data type, a service data type or an audio data type.

In the embodiment, after the trained sub-network is constructed, performance thereof can be evaluated based on the test data set to gradually optimize the network structure, until an optimal sub-network, for example, a sub-network with minimal verification losses or maximum awards, is found. In the embodiment, test data in the test data set may be input into the trained sub-network, and an evaluation result is output through the sub-network. The output evaluation result is compared to a preset standard to obtain a comparison result, and the performance of the sub-network is evaluated according to the comparison result. A test result may be the rate or precision, at which the sub-network processes the test data.

The methods according to any of the above embodiments may be applied in neural architecture search (NAS). NAS is a technique of automatically designing a neural network. Based on NAS, a neural network structure of high performance may be automatically designed according to a sample set, and the costs in using and implementing the neural network may be reduced effectively.

Given a search space, namely a set of candidate neural network structures, an optimal network structure is found in the search space using a search strategy. Then, the quality, namely performance, of the neural network structure is evaluated based on the performance evaluation strategy, for example, performance evaluation is conducted using indexes such as the data processing precision, the data processing rate, etc. of the neural network. Here, the set of candidate neural network structures includes a set of the candidate network sub-structures above.

In some embodiments, the NAS may be divided into three components: search space, search strategy, and performance evaluation strategy. The search space represents a group of neural network architectures available for search, that is, candidate neural network structures.

The search strategy defines which algorithm can be used to find an optimal network structure parameter configuration quickly and accurately for e.g., the optimization of a super parameter. The search algorithm is generally an iteration process, and defines which algorithm can be used to find an optimal network structure parameter configuration quickly and accurately. The search algorithm may include: a random search algorithm, a Bayesian search algorithm, an evolutionary learning algorithm, a reinforcement learning algorithm, an evolutionary and reinforcement learning combined algorithm, a gradient based algorithm and so on.

In each step or iteration of the search process, samples are generated from the search space, and a neural network is formed according to the samples, which is referred to as a sub-network. In embodiments of the disclosure, the samples are the target network sub-structures determined from the candidate network sub-structures in the above embodiments.

Figure 6:
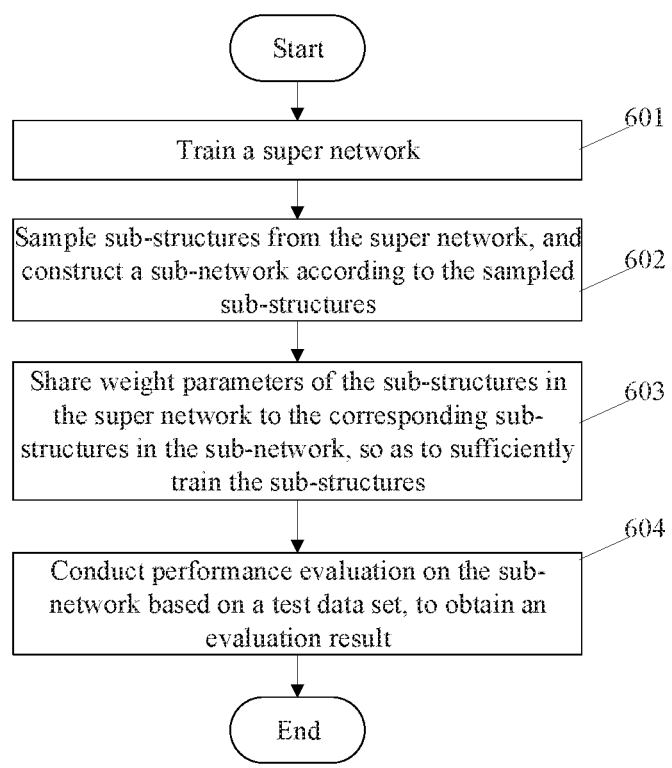
FIG. 6 illustrates a flowchart of a method for training a neural network according to some embodiments of the disclosure.

FIG. 6 illustrates a flowchart of a method for training a neural network according to some embodiments of the disclosure. As illustrated in FIG. 6, the method includes the following steps:

In step 601, a super network is trained.

Figure 7:
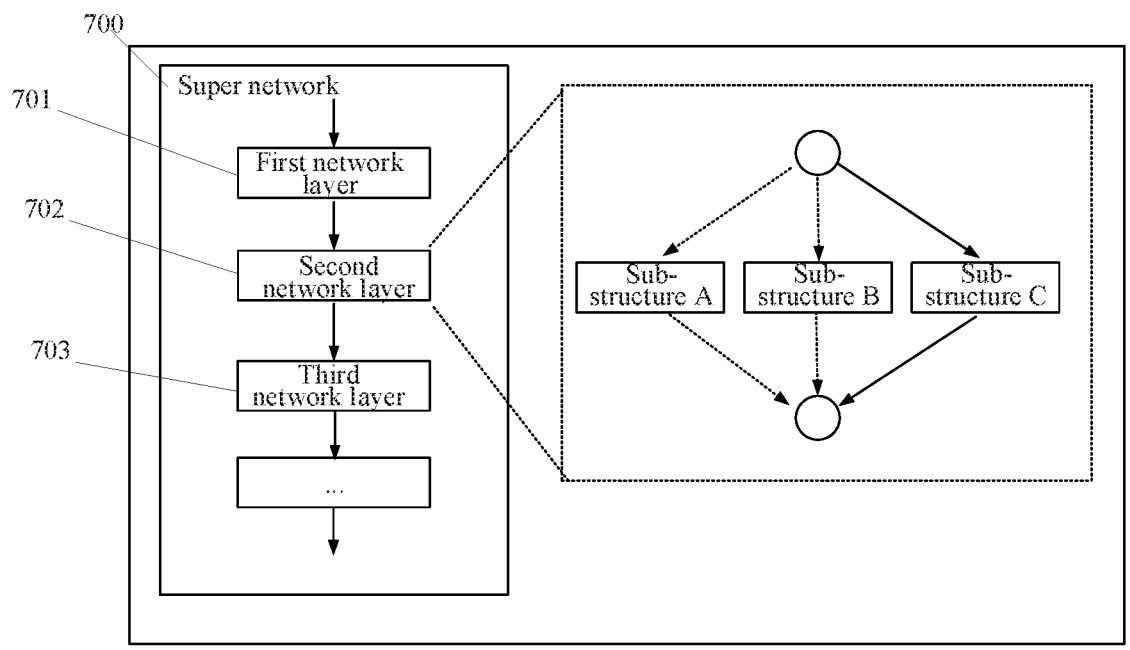
FIG. 7 illustrates a schematic structural diagram of a super network according to some embodiments of the disclosure.

In embodiments of the disclosure, in the process of searching based on NAS, a super network containing multiple network structures (referred to as sub-structures hereinafter) is trained to generate a super network containing the search space of all the sub-structures, that is, a set of candidate neural network structures. The sub-structures are part of the neural network. The super network includes multiple network layers, and each of the network layers may contain multiple sub-structures. The sub-structures may be candidate network sub-structures, and the super network is the set of all the candidate network sub-structures. FIG. 7 illustrates a schematic structural diagram of a super network 700 according to some embodiments of the disclosure. As illustrated in FIG. 7, the super network 700 contains a first network layer 701, a second network layer 702, and a third network layer 703. The first network layer 701, the second network layer 702 and the third network layer 703 each contains three parallel sub-structures, which are a sub-structure A, a sub-structure B and a sub-structure C.

A weight parameter corresponding to each network structure can be obtained after the super network is trained. At this time, a mapping relation between a structure identifier and a network parameter of the respective network sub-structure can be established, and the mapping relation is stored in a mapping table. The structure identifier may be used for uniquely identifying the network structure, and includes a serial number of the network structure, or a name of the network structure.

In step 602, sub-structures are sampled from the super network, and a sub-network is constructed according to the sampled sub-structures.

Figure 8:
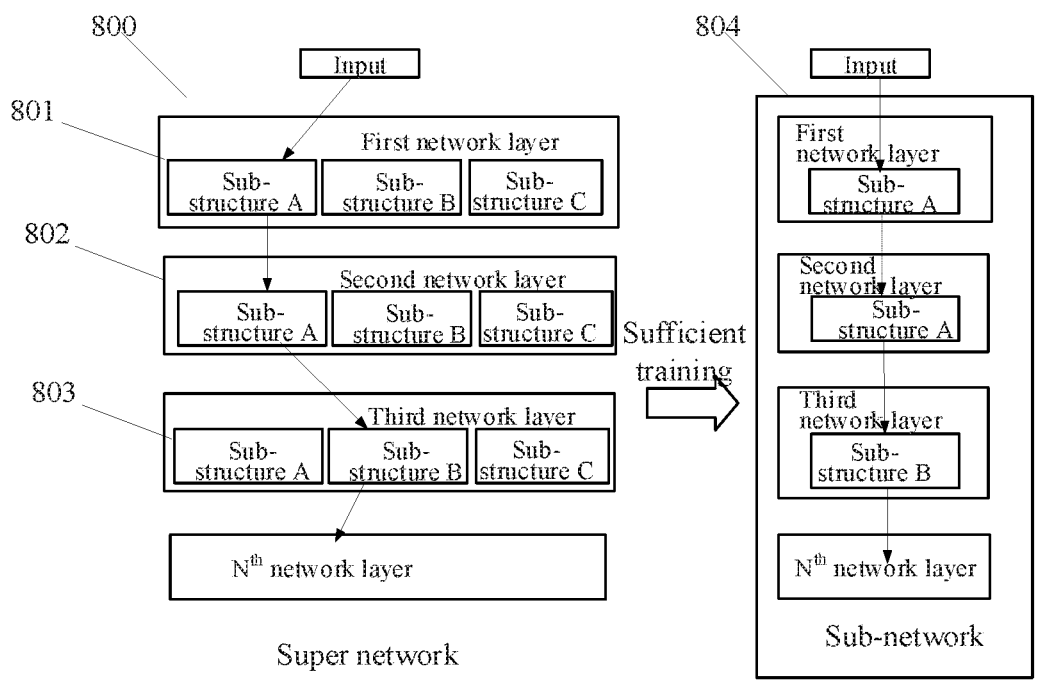
FIG. 8 illustrates a schematic diagram of constructing a sub-network according to some embodiments of the disclosure.

In the embodiment, the sub-structures may be selected from the super network, and the sub-network is constructed based on the selected sub-structures. FIG. 8 illustrates a schematic diagram of constructing a sub-network according to some embodiments of the disclosure. As illustrated in FIG. 8, a super network 800 contains a first network layer 801, a second network layer 802, and a third network layer 803. The first network layer 801, the second network layer 802, and the third network layer 803 each contain three parallel sub-structures, which are a sub-structure A, a sub-structure B, and a sub-structure C. In the process of constructing the sub-network, a sub-structure can be selected from each network layer to construct the sub-network. For example, the sub-structure A is selected to be a first network layer of a sub-network 804 from the first network layer 801 of the super network 800. The sub-structure A is selected to be a second network layer of the sub-network 804 from the second network layer 802. The sub-structure B is selected to be a third network layer of the sub-network 804 from the third network layer 803.

In step 603, weight parameters of the sub-structures in the super network are shared to the corresponding sub-structures in the sub-network, so as to sufficiently train the sub-structures.

After the super network is trained, the weight parameter corresponding to each network structure can be obtained, and a mapping relation between a structure identifier and a network parameter of the respective network sub-structure can be established. The mapping relation is stored in the mapping table. The corresponding weight parameter can be acquired from the mapping table based on the structure identifier of the respective sub-structure in the sub-network, and the weight parameter is shared to the corresponding sub-structure in the sub-network. After the weight parameters of the sub-structures in the super network are shared to the corresponding sub-structures in the sub-network, the sub-network can be trained sufficiently.

In step 604, performance evaluation is conducted on the sub-network based on a test data set, to obtain an evaluation result.

Figure 9:
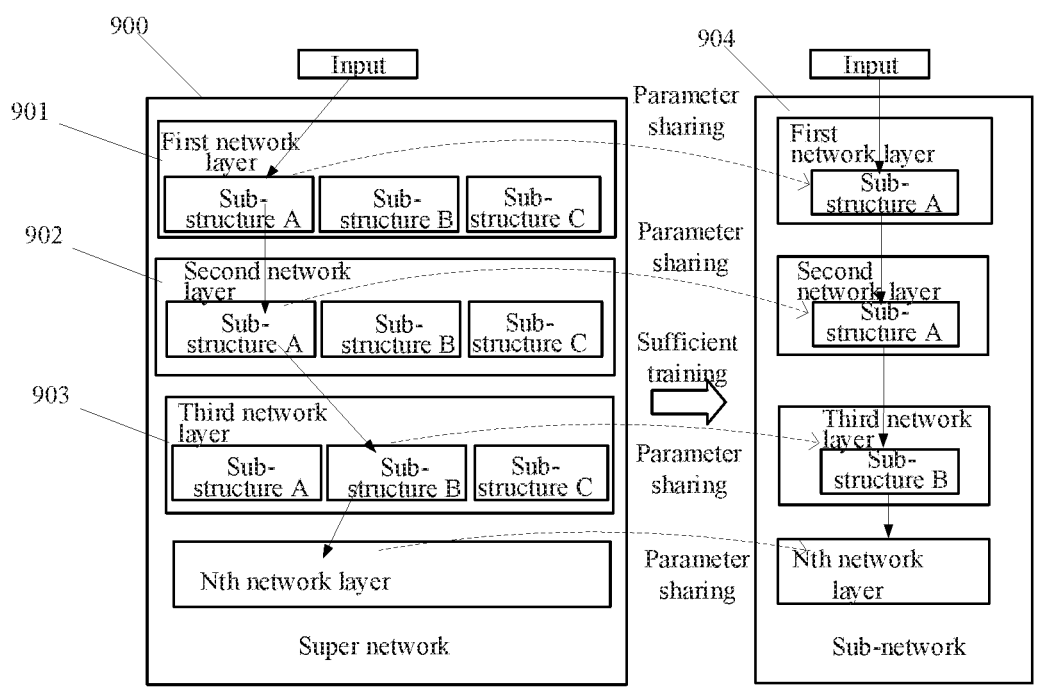
FIG. 9 illustrates a schematic diagram of sharing a weight parameter according to some embodiments of the disclosure.

FIG. 9 illustrates a schematic diagram of sharing a weight parameter according to some embodiments of the disclosure. As illustrated in FIG. 9, a super network 900 contains a first network layer 901, a second network layer 902, and a third network layer 903. The first network layer 901, the second network layer 902, and the third network layer 903 each contain three parallel sub-structures, which are a sub-structure A, a sub-structure B and a sub-structure C. In the process of constructing a sub-network, a sub-structure can be selected from each network layer to construct the sub-network. For example, the sub-structure A is selected to be a first network layer of a sub-network 904 from the first network layer 901 of the super network 900. The sub-structure A is selected to be a second network layer of the sub-network 904 from the second network layer 902. The sub-structure B is selected to be a third network layer of the sub-network 904 from the third network layer 903.

Accordingly, when sharing the weight parameters, the weight parameter of the sub-structure A of the first network layer 901 in the super network 900 may be shared to the sub-structure A of the first network layer of the sub-network 904. The weight parameter of the sub-structure A of the second network layer 902 in the super network 900 may be shared to the sub-structure A of the second network layer of the sub-network 904. The weight parameter of the sub-structure B of the third network layer 903 in the super network 900 may be shared to the sub-structure B of the third network layer of the sub-network 904.

The above described methods can be used for deep learning tasks such as, but not limited to, image classification, target detection and semantic segmentation. For example, a series of neural network models can be found based on weight-sharing NAS, and the found neural network models can be deployed in actual products. Each found neural network model does not have to be trained starting from nothing. Instead, neural network parameters inherited from a trained super network are taken to be initial parameters for training, so as to obtain a finally trained neural network model.

In embodiments of the disclosure, a sub-structure may be sampled from each network layer of the super network, and connecting relations among all the sub-structures may be established to form a sub-network. After that, the weight parameter corresponding to each sub-structure is acquired from the mapping table based on the structure identifier of the respective sub-structure in the sub-network, so as to train the sub-network. In this way, there is no need of training a found sub-network starting from nothing, not only reducing the computation burden of the neural network, but also improving the search efficiency of the search algorithm.

Figure 10:
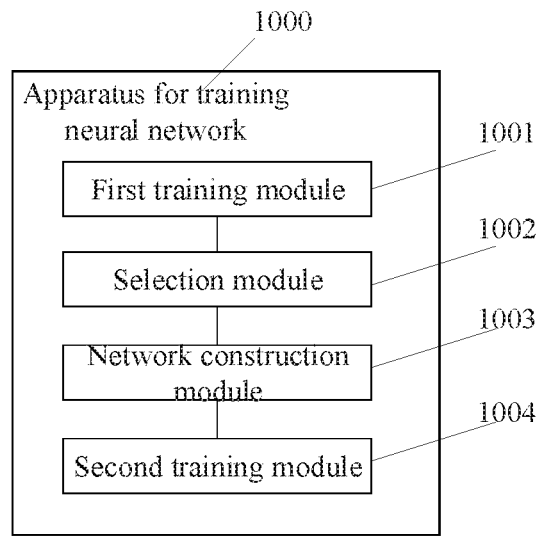
FIG. 10 illustrates a block diagram of an apparatus for training a neural network according to some embodiments of the disclosure.

FIG. 10 illustrates a block diagram of an apparatus 1000 for training a neural network according to some embodiments of the disclosure. As illustrated in FIG. 10, the apparatus 1000 for training a neural network includes: a first training module 1001, a selection module 1002, a network construction module 1003, and a second training module 1004.

The first training module 1001 is configured to train a super network to obtain a network parameter of the super network. Each network layer of the super network includes multiple candidate network sub-structures in parallel.

The selection module 1002 is configured to, for each network layer of the super network, select a candidate network sub-structure to be a target network sub-structure constructing a sub-network from the multiple candidate network sub-structures.

The network construction module 1003 is configured to construct a sub-network based on the target network sub-structures, each selected in a respective network layer of the super network.

The second training module 1004 is configured to train the sub-network, by taking the network parameter inherited from the super network as an initial parameter of the sub-network, to obtain a network parameter of the sub-network.

In an embodiment, the super network includes N network layers, and each of the network layers includes M candidate network sub-structures, where N is a positive integer no smaller than 2, and M is a positive integer no smaller than 2.

The selection module is specifically configured to select an $m^{th}$ candidate network sub-structure of an $n^{th}$ network layer of the super network to be the target network sub-structure constructing an $n^{th}$ network layer of the sub-network, where n is a positive integer smaller than or equal to N, and m is a positive integer smaller than or equal to M.

Figure 11:
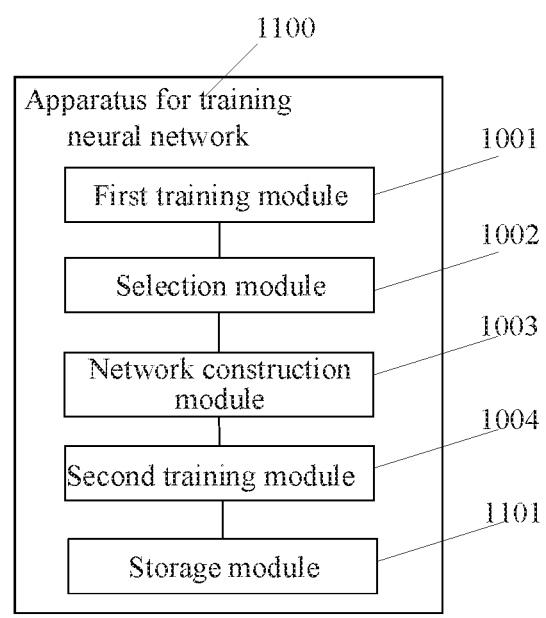
FIG. 11 illustrates a block diagram of an apparatus for training a neural network according to some embodiments of the disclosure.

FIG. 11 illustrates a block diagram of an apparatus 1100 for training a neural network according to some embodiments of the disclosure. As illustrated in FIG. 11, the apparatus 1100 for training a neural network mainly includes a storage module 1101 in addition to the first training module 1001, the selection module 1002, the network construction module 1003, and the second training module 1004.

The storage module 1101 is configured to: after obtaining the network parameter of the super network, for each of the candidate network sub-structures, store a mapping relation between a structure identifier and a network parameter of the respective candidate network sub-structure.

In an embodiment, the second training module 1004 is configured to, for each of the candidate network sub-structures contained in the sub-network, query, based on a structure identifier of the candidate network sub-structure, the mapping relation to obtain a network parameter of the candidate network sub-structure; and train, based on the obtained network parameters of the candidate network sub-structures, the sub-network, to obtain the network parameter of the sub-network.

In an embodiment, the selection module 1002 is configured to: select, based on a set search algorithm, a candidate network sub-structure to be a target network sub-structure from the multiple candidate network sub-structures of each network layer of the super network.

The set search algorithm includes at least one of the following: a random search algorithm, a Bayesian search algorithm, an evolutionary learning algorithm, a reinforcement learning algorithm, an evolutionary and reinforcement learning combined algorithm, or a gradient based algorithm.

In another embodiment, the apparatus 1100 further includes a data processing module configured to process input data based on the trained sub-network.

A type of the input data includes at least one of the following: an image data type, a text data type, or an audio data type.

In another embodiment, the apparatus 1100 further includes a performance evaluation module configured to conduct performance evaluation on the trained sub-network based on a test data set, to obtain an evaluation result.

A type of test data in the test data set includes at least one of the following: an image data type, a service data type or an audio data type.

With regard to the apparatus in the above embodiments, the specific way for the various modules to execute operations has been described in detail in the method embodiments.

In an embodiment, an apparatus for training a neural network includes a processor; and a memory configured to store instructions executable by the processor. The processor is configured to implement steps in the above described methods for training a neural network.

Figure 12:
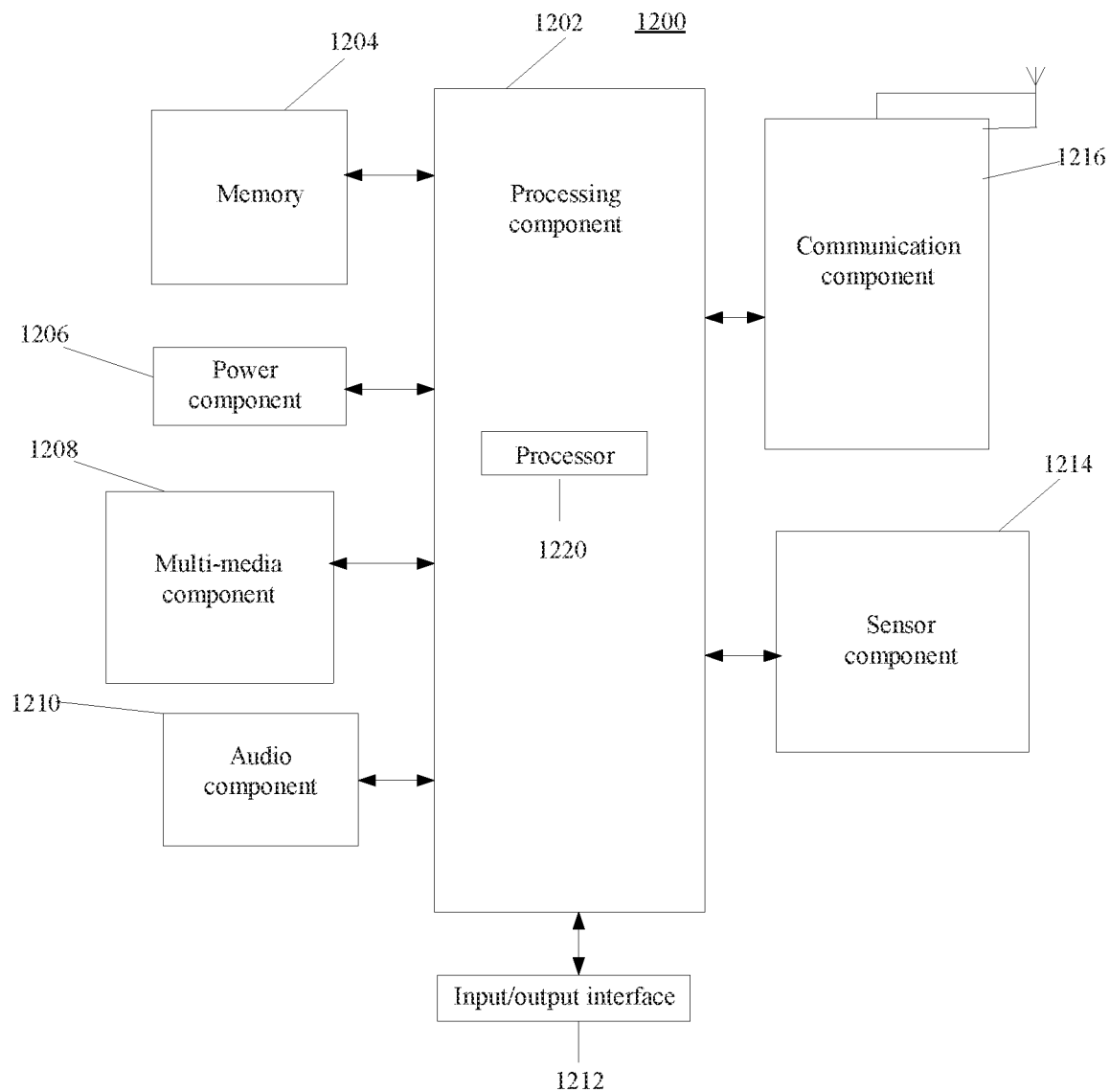
FIG. 12 illustrates a block diagram of an apparatus for training a neural network according to some embodiments of the disclosure.

FIG. 12 illustrates a block diagram of an apparatus 1200 for training a neural network according to some embodiments of the disclosure. For example, the apparatus 1200 may be a mobile phone, a computer, a digital broadcast terminal, a message transceiving device, a game console, a tablet device, medical equipment, fitness equipment, a personal digital assistant, etc.

As illustrated in FIG. 12, the apparatus 1200 may include one or more of the following: a processing component 1202, a memory 1204, a power component 1206, a multi-media component 1208, an audio component 1210, an input/output (I/O) interface 1212, a sensor component 1214, and a communication component 1216.

The processing component 1202 generally controls the overall operation of the apparatus 1200, such as operations associated with display, a phone call, data communication, a camera operation and a recording operation. The processing component 1202 may include one or more processors 1220 to execute instructions, so as to complete all or some blocks in the methods above. In addition, the processing component 1202 may include one or more modules for the interaction between the processing component 1202 and the other components. For example, the processing component 1202 may include a multi-media module for interaction between the multi-media component 1208 and the processing component 1202.

The memory 1204 is configured to store various types of data so as to support operations at the apparatus 1200. The examples of these types of data include instructions of any application or method for operating on the apparatus 1200, contact person data, phone book data, messages, pictures, video, etc. The memory 1204 may be implemented by any type of volatile or non-volatile storage device or a combination of both, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1206 supplies power for the various components of the apparatus 1200. The power component 1206 may include a power management system, one or more power sources, and other components associated with the generation, management and distribution of power for the apparatus 1200.

The multi-media component 1208 includes a screen serving as an output interface between the apparatus 1200 and a user. In some embodiments, the screen may include a liquid crystal display (LCD) and a touch pad (TP). If the screen includes a touch pad, then the screen may be implemented as a touch screen so as to receive an input signal from the user. The touch pad includes one or more touch sensors to sense touch, slide and gestures on the touch pad. The touch sensors may not only sense the boundary of a touch or slide action, but also can detect the duration and pressure related to the touch or slide operation. In some embodiments, the multi-media component 1208 includes a front camera and/or a rear camera. When the apparatus 1200 is in an operating mode, such as a photography mode or a video mode, the front camera and/or the rear camera may receive external multi-media data. Each front camera and rear camera may be a fixed optical lens system or have a focal length or optical zoom capability.

The audio component 1210 is configured to output and/or input an audio signal. For example, the audio component 1210 includes a microphone (MIC), and when the apparatus 1200 is in an operating mode, such as a calling mode, a recording mode and a voice recognition mode, the microphone is configured to receive an external audio signal. The received audio signal can be further stored in the memory 1204 or sent via the communication component 1216. In some embodiments, the audio component 1210 further includes a loudspeaker for outputting an audio signal.

The I/O interface 1212 provides an interface between the processing component 1202 and a peripheral interface module, and the above peripheral interface module may be a keyboard, a click wheel, a button, etc. The button may include but is not limited to a home page button, a volume button, a start button and a locking button.

The sensor component 1214 includes one or more sensors for providing state evaluation for the apparatus 1200 from various aspects. For example, the sensor component 1214 may detect an on/off state of the apparatus 1200, and the relative positioning between components; for example, the components are a display and keyboard of the apparatus 1200. The sensor component 1214 may also detect a positional change of the apparatus 1200 or a component of the apparatus 1200, whether there is contact between a user and the apparatus 1200, the orientation or acceleration/deceleration of the apparatus 1200, and a temperature change of the apparatus 1200. The sensor component 1214 may include a proximity sensor configured to detect the existence of an object nearby without any physical contact. The sensor component 1214 may also include an optical sensor, such as a CMOS or CCD image sensor, for use in an imaging application. In some embodiments, the sensor component 1214 may also include an acceleration sensor, a gyroscope sensor, a magnetic sensor, a pressure sensor or a temperature sensor.

The communication component 1216 is configured for wired or wireless communication between the apparatus 1200 and another device. The apparatus 1200 may access a communication standard based wireless network, such as WiFi, 4G, 5G or a combination thereof. In some embodiments of the disclosure, the communication component 1216 receives a broadcast signal from an external broadcast management system or broadcasts relevant information through a broadcast channel. In some embodiments, the communication component 1216 further comprises a near-field communication (NFC) module for short-range communication. In some embodiments, the communication component 1216 may be implemented based on the radio-frequency identification (RFID) technique, the infrared data association (IrDA) technique, the ultra-wide band (UWB) technique, the Bluetooth (BT) technique or others.

In some embodiments of the disclosure, the apparatus 1200 may be implemented by one or more application-specific integrated circuit (ASIC), a digital signal processor (DSP), a digital signal processing device (DSPD), a programmable logic device (PLD), a field programmable gate array (FPGA), a controller, a micro-controller, a microprocessor or other electronic elements, for executing the above methods.

In some embodiments of the disclosure, a non-transitory computer-readable storage medium including instructions is also provided, such as instructions included in the memory 1204. The instructions may be executed by the processor 1220 of the apparatus 1200 to perform the above described methods. For example, the non-transitory computer-readable storage medium may be a ROM, a random access memory (RAM), a CD-ROM, a magnetic tape, a floppy disk, an optical data storage device and so on.

The instructions in the storage medium, when executed by a processor of a mobile terminal, may cause the mobile terminal to execute the above described methods for training a neural network.

Figure 13:
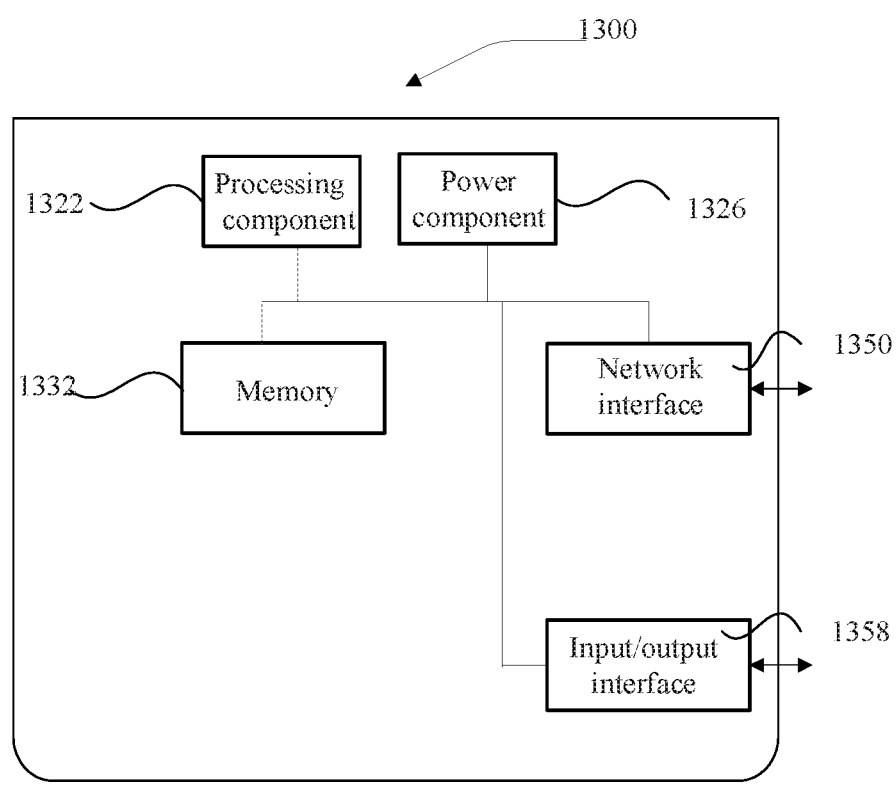
FIG. 13 illustrates a block diagram of another apparatus for training a neural network according to some embodiments of the disclosure.

FIG. 13 illustrates a block diagram of another apparatus 1300 for training a neural network according to some embodiments of the disclosure. For example, the apparatus 1300 may be provided as a server. As illustrated in FIG. 13, the apparatus 1300 includes a processing component 1322, which further includes one or more processor, and a memory resource represented by a memory 1332, for storing instructions executable by the processing component 1322, for example an application program. The application program stored in the memory 1332 may include one or more modules, each corresponding to a set of instructions. In addition, the processing component 1332 is configured to execute an instruction so as to carry out the above described methods for training a neural network.

The apparatus 1300 may also include: a power component 1326 configured to perform power management of the apparatus 1300; a wired or wireless network interface 1350 configured to connect the apparatus 1300 to a network; and an input/output (I/O) interface 1358. The apparatus 1300 may operate based an operating system stored in the memory 1332, for example Windows Server™, Mac OS X™, Unix™, Linux™, FreeBSD™ or the like.

The technical solutions provided in embodiments of the disclosure may have the following beneficial effects:

It can be seen from the above embodiments that, in the disclosure, a sub-network can inherit a network parameter from a super network; the network parameter is taken as an initial parameter of the sub-network, so as to train the sub-network to obtain a network parameter of the sub-network. There is no need of training the sub-network starting from nothing. The computation burden in the process of neural network training can be reduced, thus improving the efficiency of neural network training.

Other embodiments of the present disclosure will be apparent to those skilled in the art from consideration of the specification and practice of the disclosure disclosed here. The present disclosure covers any variations, uses, or adaptations of the present disclosure following the general principles thereof and including such departures from the present disclosure as come within known or customary practice in the art. The described embodiments are exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for training a neural network, comprising:
training a super network to obtain a network parameter of the super network, wherein each network layer of the super network comprises multiple candidate network sub-structures in parallel, wherein the network parameter of the super network comprises a weight parameter of the super network;
after obtaining the network parameter of the super network, for each of the candidate network sub-structures, storing a mapping relation between a structure identifier and a network parameter of the respective candidate network sub-structure;
for each network layer of the super network, selecting, from the multiple candidate network sub-structures, a candidate network sub-structure to be a target network sub-structure;
constructing a sub-network based on target network sub-structures each selected in a respective network layer of the super network;
for each of the candidate network sub-structures contained in the sub-network, querying, based on a structure identifier of the candidate network sub-structure, the mapping relation to obtain a network parameter of the candidate network sub-structure; and
training the sub-network based on the obtained network parameters of the candidate network sub-structures, to obtain a network parameter of the sub-network.

2. The method according to claim 1, wherein
the super network comprises N network layers, and each of the network layers comprises M candidate network sub-structures, where N is a positive integer no smaller than 2, and M is a positive integer no smaller than 2; and
wherein for each network layer of the super network, selecting, from the multiple candidate network sub-structures, a candidate network sub-structure to be a target network sub-structure comprises:
selecting an $m^{th}$ candidate network sub-structure of an $n^{th}$ network layer of the super network to be the target network sub-structure constructing an $n^{th}$ network layer of the sub-network, where n is a positive integer smaller than or equal to N, and m is a positive integer smaller than or equal to M.

3. The method according to claim 1, wherein for each network layer of the super network, selecting, from the multiple candidate network sub-structures, the candidate network sub-structure to be the target network sub-structure comprises:
selecting, based on a set search algorithm, a candidate network sub-structure from the multiple candidate network sub-structures of each network layer of the super network to be a target network sub-structure;
wherein the set search algorithm comprises at least one of: a random search algorithm, a Bayesian search algorithm, an evolutionary learning algorithm, a reinforcement learning algorithm, an evolutionary and reinforcement learning combined algorithm, or a gradient based algorithm.

4. The method according to claim 1, further comprising:
processing input data based on the trained sub-network, wherein a type of the input data comprises at least one of: an image data type, a text data type, or an audio data type.

5. The method according to claim 1, further comprising:
conducting performance evaluation on the trained sub-network based on a test data set, to obtain an evaluation result,
wherein a type of test data in the test data set comprises at least one of: an image data type, a service data type or an audio data type.

6. An apparatus for training a neural network, comprising:
a processor; and
a memory configured to store instructions executable by the processor,
wherein the processor is configured to:
train a super network to obtain a network parameter of the super network, wherein each network layer of the super network comprises multiple candidate network sub-structures in parallel, wherein the network parameter of the super network comprises a weight parameter of the super network;
after obtaining the network parameter of the super network, for each of the candidate network sub-structures, store a mapping relation between a structure identifier and a network parameter of the respective candidate network sub-structure;
for each network layer of the super network, select, from the multiple candidate network sub-structures, a candidate network sub-structure to be a target network sub-structure;
construct a sub-network based on target network sub-structures each selected in a respective network layer of the super network;
for each of the candidate network sub-structures contained in the sub-network, query, based on a structure identifier of the candidate network sub-structure, the mapping relation to obtain a network parameter of the candidate network sub-structure; and
train the sub-network based on the obtained network parameters of the candidate network sub-structures, to obtain a network parameter of the sub-network.

7. The apparatus according to claim 6, wherein
the super network comprises N network layers, and each of the network layers comprises M candidate network sub-structures, where N is a positive integer no smaller than 2, and M is a positive integer no smaller than 2; and
wherein the processor is further configured to:
select an $m^{th}$ candidate network sub-structure of an $n^{th}$ network layer of the super network to be the target network sub-structure constructing an n$^{th}$ network layer of the sub-network, where n is a positive integer smaller than or equal to N, and m is a positive integer smaller than or equal to M.

8. The apparatus according to claim 6, wherein the processor is further configured to:
   select, based on a set search algorithm, a candidate network sub-structure from the multiple candidate network sub-structures of each network layer of the super network to be a target network sub-structure;
   wherein the set search algorithm comprises at least one of: a random search algorithm, a Bayesian search algorithm, an evolutionary learning algorithm, a reinforcement learning algorithm, an evolutionary and reinforcement learning combined algorithm, or a gradient based algorithm.

9. The apparatus according to claim 6, wherein the processor is further configured to:
   process input data based on the trained sub-network,
   wherein a type of the input data comprises at least one of: an image data type, a text data type, or an audio data type.

10. The apparatus according to claim 6, wherein the processor is further configured to:
    conduct performance evaluation on the trained sub-network based on a test data set, to obtain an evaluation result,
    wherein a type of test data in the test data set comprises at least one of: an image data type, a service data type or an audio data type.

11. A non-transitory computer-readable storage medium having stored therein instructions that, when executed by a processor of a device, cause the device to perform a method for training a neural network, the method comprising:
    training a super network to obtain a network parameter of the super network, wherein each network layer of the super network comprises multiple candidate network sub-structures in parallel, wherein the network parameter of the super network comprises a weight parameter of the super network;
    after obtaining the network parameter of the super network, for each of the candidate network sub-structures, storing a mapping relation between a structure identifier and a network parameter of the respective candidate network sub-structure;
    for each network layer of the super network, selecting, from the multiple candidate network sub-structures, a candidate network sub-structure to be a target network sub-structure;
    constructing a sub-network based on target network sub-structures each selected in a respective network layer of the super network;
    for each of the candidate network sub-structures contained in the sub-network, querying, based on a structure identifier of the candidate network sub-structure, the mapping relation to obtain a network parameter of the candidate network sub-structure; and
    training the sub-network based on the obtained network parameters of the candidate network sub-structures, to obtain a network parameter of the sub-network.

12. The non-transitory computer-readable storage medium according to claim 11, wherein
    the super network comprises N network layers, and each of the network layers comprises M candidate network sub-structures, where N is a positive integer no smaller than 2, and M is a positive integer no smaller than 2; and
    wherein for each network layer of the super network, selecting, from the multiple candidate network sub-structures, a candidate network sub-structure to be a target network sub-structure comprises:
    selecting an m$^{th}$ candidate network sub-structure of an n$^{th}$ network layer of the super network to be the target network sub-structure constructing an n$^{th}$ network layer of the sub-network, where n is a positive integer smaller than or equal to N, and m is a positive integer smaller than or equal to M.

13. The non-transitory computer-readable storage medium according to claim 11, wherein for each network layer of the super network, selecting, from the multiple candidate network sub-structures, the candidate network sub-structure to be the target network sub-structure comprises:
    selecting, based on a set search algorithm, a candidate network sub-structure from the multiple candidate network sub-structures of each network layer of the super network to be a target network sub-structure;
    wherein the set search algorithm comprises at least one of: a random search algorithm, a Bayesian search algorithm, an evolutionary learning algorithm, a reinforcement learning algorithm, an evolutionary and reinforcement learning combined algorithm, or a gradient based algorithm.

14. The non-transitory computer-readable storage medium according to claim 11, wherein the method further comprises:
    processing input data based on the trained sub-network,
    wherein a type of the input data comprises at least one of: an image data type, a text data type, or an audio data type.

* * * * *